Jan. 4, 1966 T. NOVACK 3,227,537
METHOD OF FORMING GLASS RIBBONS
Filed Dec. 6, 1961
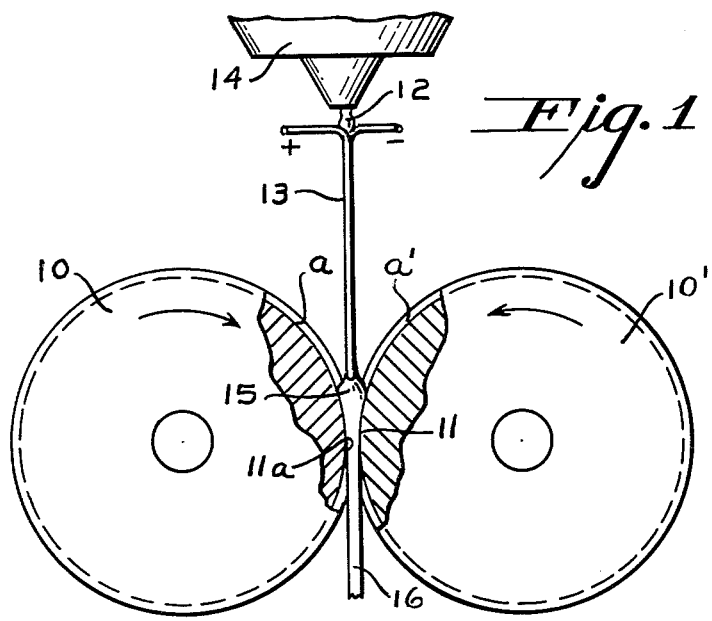
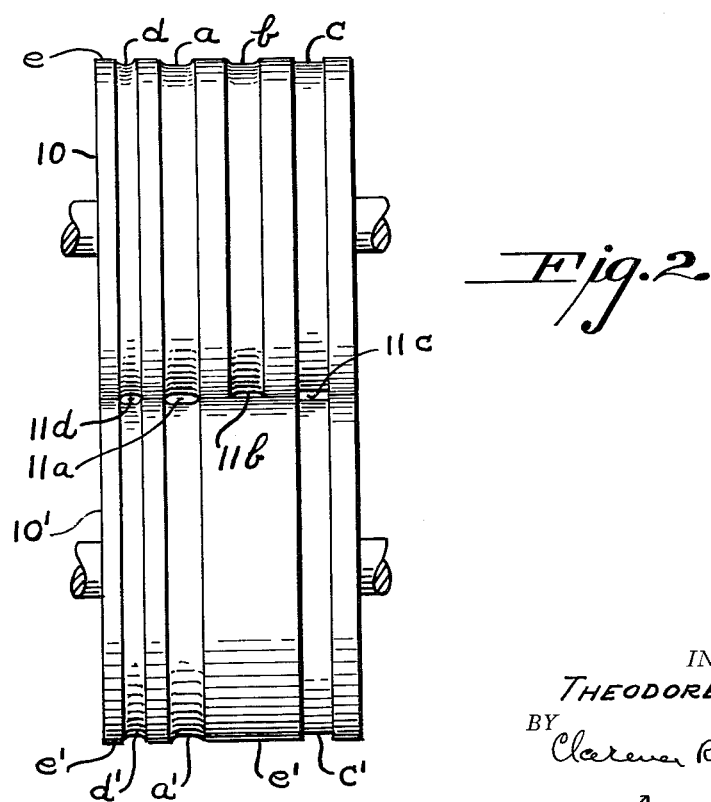
INVENTOR.
THEODORE NOVACK
BY Clarence R. Batty, Jr.
ATTORNEY 3,227,537
METHOD OF FORMING GLASS RIBBONS
Theodore Novack, Big Flats, N.Y., assignor to Corning Glass Works, Corning, N.Y., a corporation of New York
Filed Dec. 6, 1961, Ser. No. 157,440
6 Claims. (Cl. 65—101)

This invention relates to the roll forming of vitreous or glass-like materials, and more particularly to the continuous formation of ribbon of substantially uniform cross section from low viscosity molten glass-like materials.

In the past it has been customary to roll form glass sheet or ribbon, such as the soda-lime variety utilized in plate and window glass, by means of the ring roll process, the upward vertical rolling process, or the continuous horizontal process. In these processes the viscosity of the glass fed to the rollers is normally about several thousand poises and the ribbon or sheet formed is usually within the range of about ⅛ inch to 1 inch in thickness. These conventional roll forming methods, however, are completely inadequate and unsatisfactory for roll forming extremely thin ribbon having a thickness in the magnitude of between 1 mil and 10 mils, or for forming ribbon from low viscosity glass-like materials, which when delivered to the rollers may have a viscosity of below 10 poises.

I have found that in roll forming low viscosity glass-like materials, such as the readily devitrifiable or thermally crystallizable low viscosity barium titanate glasses, particular problems are involved which are peculiar to such glasses. Due to the relatively high surface tension of such glasses in their molten state, they have a tendency to break up and form a plurality of droplets when in free fall, and accordingly it is extremely difficult to deliver a continuous molten stream to the bite of the forming rollers at the relatively low flow rate which must be utilized. In addition, due to their readily devitrifiable nature, I have found that the amount and duration of glass contact with the surface of the rollers before entering the bite must be maintained at a minimum, and that all of the outer surfaces including the front, back and side edge portions of the strip passing through the rollers must be cooled substantially instantaneously, in order to avoid undesirable devitrification or pre-crystallization. Further, the simultaneous setting up of all of the outer surface portions including the side edge portions of the ribbon, as it passes through the bite of the cooperation rollers, is necessary to avoid the formation of beaded edges which would otherwise be formed due to the sensible heat retained by such edge portions.

My invention solves the above enumerated problems peculiar to the roll forming of low viscosity glass-like material. In brief, a wire-like guide is utilized to deliver a continuous flow of such low viscosity material to a point adjacent the bite of the pair of cooperating rollers. The rate of flow and the speed of formation are controlled so as to maintain a shallow or minimum depth pool of such molten material adjacent the bite of the rollers, to minimize roller surface contact with the molten pool before passing through the bite and thereby inhibit devitrification on such surfaces. The roller surfaces are provided with a peripheral grooved portion which continually forms a closed sided opening at the bite of the cooperating rollers as they are rotated. Molten material from the pool is confined within such closed sided opening as it is drawn through the rollers. The closed sided opening not only facilitates the solidification of the normally contacted front and back surface portions of the strip, but also the substantially simultaneous setting up of the edge portions. Accordingly, such novel construction, formed at the bite of the rollers, inhibits both the formation of beaded and pre-divitrified edge portions.

It thus has been an object of my invention to provide a new method of roll forming low viscosity glass-like materials which solves and eliminates the problems peculiar to such materials which would be encountered with the known conventional roll forming processes.

A further object of my invention has been to facilitate the roll forming of low viscosity vitreous material by providing a novel means for and method of delivering a continuous stream of such material to the bite of a pair of cooperating rollers.

An additional object of my invention has been to provide an improved method of and means for producing a relatively thin ribbon of glass-like material having improved homogeneity and cross sectional uniformity from low viscosity molten glass-like material by substantially simultaneously cooling and setting up all of the surface portions of the ribbon, including the side edge portions, as it passes through the bite of a pair of cooperating rollers.

These and other objects of my invention will be more apparent to those skilled in the art from the following description and accompanying drawing in which:

FIGURE 1 is a side elevational view, partially in section, of an embodiment of my invention disclosing the feeding of a continuous stream of low viscosity molten material to the bite of a pair of cooperating rollers and the formation of ribbon therefrom; and, FIGURE 2 is a top planned view of a pair of cooperating rollers embodying my invention.

Referring now to the drawings, and particularly FIGURE 1, a pair of cooperating rollers 10, 10' are shown as having a pair of complementary peripheral grooves or recesses, a, a' (greatly exaggerated in depth for purposes of clarity) which form an orifice or enclosed passageway 11a at the bite of the rollers (see also FIGURE 2). Molten glass-like material 12 of low viscosity is directed to and collected on a wire-like guide 13 from an orifice or downspout 14 of a suitable melting and fining controlled delivery source such as illustrated in my co-pending application Serial No. 139,809, filed September 21, 1961. The molten glass-like material 12 flows along the wire-like guide member 13 in a continuous stream to a point immediately above the bite 11 of the cooperating rollers 10, 10' where a pool 15 of such molten material is formed. The guide member 13 may be in the form of a U-shaped loop, which is desirably heated, such as by passing an electric current therethrough, to facilitate the flow of the low viscosity glass-like material in a continous stream therealong and prevent the devitrification of such material thereon. The rollers 10, 10' are continuously rotated by any well-known variable drive means, in the direction of the arrows shown in FIGURE 1 to withdraw molten material at a desired rate from the pool 15 and pass it through the closed sided passageway or continually formed orifice 11a, wherein front, back and edge portions thereof are substantially simultaneously solidified to continuously form a ribbon 16 of improved cross sectional uniformity.

Referring now to FIGURE 2, it can be seen that the cooperating rollers 10, 10' may have a plurality of complementary grooves a, a', c, c', and d, d', so that a variety of ribbon of various thicknesses and widths may be produced from one set of rollers, by merely directing the feed to a preselected area along the bite of the rollers. Not only may the width and depth of these various grooves be varied, but also the cross sectional configuration. The grooves a, a', and d, d', for instance, are shown having rounded corners or arcuate portions, with the grooves a, a' merely being somewhat wider than the grooves d, d'. The grooces c, c', however, are shown as having square corners between their side edge or wall portions and the inner periphery or base portions. I have found, however, that such square cornered grooves necessitate extremely close flow control since the beaded edges, which are always formed with the usual continuous non-grooved rollers, are only eliminated when such square grooves are entirely filled. With the rounded grooves, on the other hand, the pull rate is not as critical as might be expected, because the rounded edge portions of such grooves adequately chill the side edges of the ribbon to eliminated bead formation, even when the grooves are not entirely filled.

When utilizing cooperating or complementary grooves such as $a$, $a'$, $c$, $c'$, and $d$, $d'$, each of the cooperating grooves is recessed to a depth approximately one-half of the desired thickness of the ribbon to be formed. Accordingly, the resulting continuously formed orifices or closed sided passageways $11a$, $11c$, and $11d$, respectively, are of a depth substantially equal to the desired thickness of the ribbon to be formed. The edge portions or outer peripheries $e$, $e'$, of the rollers $10$, $10'$ are held in substantial continuous rolling engagement during the forming operation, and the molten glass-like material from pool 15 is directed solely through the orifice formed by the desired grooved portion.

Groove $b$, formed in roller 10, like grooves $a$ and $d$, is shown having rounded edge or corner portions between its side walls and inner periphery. However, unlike grooves $a$ and $d$, groove $b$ does not have a cooperating, complementary groove formed in roller $10'$, but rather cooperates with the outer peripheral edge portion $e'$ of roller $10'$ to continuously form an orifice or closed sided passageway $11b$. Groove $b$ is accordingly formed with a depth substantially equal to the desired thickness of the ribbon to be formed. When roll forming with a single groove, that is one without a complementary groove in the adjacent roller, I have found that it is desirable to provide the groove with rounded corners or curved side edge portions, such as shown in grooves $a$, $b$, and $d$ of FIGURE 2. If a single groove is utilized, having square corners as shown by groove $c$ of FIGURE 2, the ribbon tends to stick in the groove and travel around with the roller.

In operation molten low viscosity glass is directed from a melting and fining source to the wire-like guide member 13. The guide member 13, which may be made of a platinum or platinum-rhodium alloy wire, is heated to maintain the low viscosity glass in its molten state as it flows along the wire in a continuous stream to the pool 15. The pool 15, formed at the bite of the rollers 10, 10', is maintained at a minimum depth to minimize the amount and duration of roller surface contact with the molten glass prior to passing between the bite, and thus inhibit devitrification on such roller surface portions. The rollers 10, 10', which are water cooled by any suitable well-known means such as shown in Danner Patent No. 2,225,369 to maintain a constant roll temperature for uniformity, are rotated at a predetermined speed to withdraw molten glass from the pool 15 and pass it through the continuously formed orifice or closed sided passageway produced by the cooperating grooves at a rate sufficient to substantially simultaneously cool and set up all surface portions of the ribbon to avoid beading and devitrification of the edge portions, and thus produce a ribbon having improved cross sectional uniformity.

When attempting to stream feed forming rollers at the required relatively low flow rate with readily devitrifiable low viscosity molten glass-like material having relatively high surface tension, without the use of a wire-like guide, I found that it was not only impossible to obtain a continuous stream due to the high surface tension of the glass, which caused it to fall in droplets, but also due to its high rate of devitrification, such droplets had a tendency to devitrify before reaching the pool maintained adjacent the bite of the rollers. Also, it was found that when this material was formed into ribbon by conventional smooth surfaced rollers, the edge portions of the ribbon were not cooled or set up and accordingly, not only did the edges have a tendency to devitrify, but also due to the high surface tension, the edges became beaded after leaving the rolls.

Although a relatively low flow rate is necessary for forming very thin ribbon, the flow rate, of course depends upon the width and thickness of the ribbon being produced. For example, I have found that when forming a ribbon having a thickness of about 3 mils and a width of about ⅛ inch, that a flow rate of about 2 pounds per hour is sufficient, whereas when forming a ribbon having a thickness of about 10 mils and a width of about ¾ of an inch, a flow rate of about 75 pounds per hour is required. The speed at which such ribbon may be rolled, however, is limited to an operable working range of between about 60 and 100 feet per minute. Lower rolling speeds produce a crushed ribbon center, whereas at higher speeds the ribbon leaves the rollers in an extremely soft and sometimes fluid state.

The following specific embodiment of my invention, which is by no means limiting in nature, is set forth solely as an illustrative example so that those skilled in the art may more readily understand and practice the invention. An extremely low viscosity and readily devitrifiable barium titanate glass having a relatively high surface tension was delivered to an electrically heated platinum wire guide at a rate of about 2 pounds per hour. The guide was heated to a temperature of about 1350° C. and a continuous stream of the molten barium titanate glass at a viscosity of about one-half poise was delivered to a minimum depth pool maintained at a preselected area between a pair of cooperating water cooled rollers immediately above the bite thereof. The rollers were provided with a pair of complementary peripheral grooves, substantially of equal depth, which continuously formed a closed sided orifice or passageway having a width of about ⅛ inch and a thickness of about 3 mils. The rollers, with the outer peripheral edges in rolling contact, were rotated at a speed sufficient to continuously form a ribbon having a width of about ⅛ inch and a thickness of about 3 mils at the rate of about 70 feet per minute. Since the molten glass which was utilized to form the ribbon was drawn from the pool solely through the continuously formed closed sided passageway, the front, back, and edge portions of the ribbon were cooled and set up substantially simultaneously as it passed through the rollers. Accordingly, the ribbon thus produced had improved homogeneity and cross sectional uniformity since such uniform cooling prevents random devitrification and the formation of beaded edges which otherwise would be produced with the conventional continuous surface rollers.

Although I have disclosed a preferred embodiment of my invention, it is to be understood that various changes and modifications may be made thereto by those skilled in the art without departing from the spirit and scope of the invention as defined in the following claims:

What is claimed is:

1. A method of continuously forming relatively thin ribbon of improved dimensional uniformity from low viscosity molten glass-like material comprising, feeding such molten glass-like material vertically downwardly along the outer surface of a wire-like guide to a point immediately above the bite of a pair of cooperating rollers adjacent a pre-selected recessed zone formed in such rollers, applying a variable amount of heat to said wire-like guide to control such feed, maintaining a minimum depth pool of such molten glass-like material immediately above the bite of such roller to minimize contact with the individual roller surfaces before being drawn through the bite and thereby inhibit devitrification of the glass-like material thereon, rotating the rollers to continuously withdraw molten glass-like material from the pool, passing such material through a closed sided opening continuously formed at the bite of the cooperating rollers having front, back and sidewall portions to form a continuous ribbon of substantially uniform cross section, and controlling the rate of rotation and cooling of such rollers to substantially simultaneously solidify all of the surface portions of the ribbon as it passes through the cooperating rollers.

2. A method of continuously forming relatively thin ribbon of substantially uniform cross section having a thickness of between about 1 and 10 mils from low viscosity readily devitrifiable glass-like material comprising, delivering a flow of relatively readily devitrifiable glass-like material having a viscosity of between about .3 and 10 poises downwardly along the longitudinal extent of a wire-like guide to a pair of cooperable rollers, applying a variable amount of heat to said wire-like guide to control the feed to said rollers, rotating the rollers and permitting the molten glass-like material to enter the bite of such rollers solely within a closed sided opening continuously formed between such rollers, and controlling the rate of rotation and cooling of said rollers to substantially simultaneously solidify front, back and edge portions of the molten glass-like material as it passes through such opening to form a substantially uniform ribbon of continuous length.

3. In the roll forming of glass-like ribbon from molten vitreous material, an improved process for eliminating the formation of beaded edges along such ribbon comprising the steps of directing molten vitreous material within a closed sided recess continuously formed at the bite of a pair of cooperating rollers, and substantially instantaneously solidifying the front, back and edge portions of the molten vitreous material as it passes through such recess to form a ribbon of glass-like material having improved cross sectional uniformity.

4. In the roll forming of relatively thin ribbon of glass-like material an improved process for facilitating the utilization of readily devitrifiable extremely low viscosity molten glass-like material for feeding the rollers to produce substantially clear continuous lengths of glass-like ribbon without beaded edges and having improved cross sectional dimensional uniformity comprising, delivering a continuous flow of molten glass-like material having a viscosity of below 10 poises to a pair of cooperating rollers, maintaining a pool of such material adjacent the bite of the rollers, rotating the rollers to continuously draw molten glass-like material from such pool and direct it solely through a confined opening having enclosing front, back, and side wall portions of predetermined size continuously formed at the bite of such rollers, and substantially simultaneously solidifying all of the surface portions including the side edge portions of the molten glass-like material as it passes through the confined opening to produce a clear substantially uniform continuous length ribbon of glass-like material.

5. In the process of roll forming glass-like material, the improved method of delivering a continuous stream of molten low viscosity glass-like material having relatively high surface tension comprising, directing molten glass-like material having a viscosity of below 10 poises as it emanates from a melting and fining source to an upper portion of a wire-like guide, delivering such low viscosity molten glass-like material along the wire-like guide to a point immediately above the bite of a pair of cooperating rollers, applying a variable amount of heat to said wire-like guide to control the rate of flow therealong and maintain a pool of such molten low viscosity glass-like material adjacent the bite so that such material may be continuously drawn through the rotating rollers.

6. In the process of forming glass-like material, the improved method of delivering at a relatively low flow rate a continuous stream of molten low viscosity glass-like material having relatively high surface tension comprising, directing the molten glass-like material as it emanates from a melting and fining source to an upper portion of a wire-like guide, heating such guide to maintain the glass-like material in a molten condition, delivering such low viscosity molten glass-like material vertically-downwardly along the longitudinal extent of the wire-like guide to a point immediately adjacent the feeding end of a forming device, varying the amount of heat applied to said wire-like guide to control the flow therealong, and supplying such forming device with molten glass-like material from the wire-like guide.

References Cited by the Examiner
UNITED STATES PATENTS

| | | | |
|---|---|---|---|
| 271,911 | 2/1883 | Pearson | 18—9 |
| 1,548,444 | 8/1925 | Corl | 65—95 |
| 1,813,539 | 7/1931 | Hurley | 80—59 X |
| 1,905,849 | 4/1933 | Geltstharp | 65—101 X |
| 2,225,369 | 12/1940 | Danner | 65—101 |
| 3,063,093 | 11/1962 | Barnard | 65—185 X |

DONALL H. SYLVESTER, *Primary Examiner.*